(12) United States Patent
Wu

(10) Patent No.: US 8,467,787 B2
(45) Date of Patent: Jun. 18, 2013

(54) METHOD AND APPARATUS FOR SEARCHING FOR MODES AND FREQUENCIES

(75) Inventor: Gengshi Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 207 days.

(21) Appl. No.: 12/779,712

(22) Filed: May 13, 2010

(65) Prior Publication Data

US 2010/0222056 A1 Sep. 2, 2010

Related U.S. Application Data

(63) Continuation of application No. PCT/CN2008/072396, filed on Sep. 17, 2008.

(30) Foreign Application Priority Data

Dec. 27, 2007 (CN) .......................... 2007 1 0198656
May 19, 2008 (CN) .......................... 2008 1 0097935

(51) Int. Cl.
  *H04W 4/00* (2009.01)
  *H04W 36/00* (2009.01)
  *H04M 1/00* (2006.01)
  *H04B 7/216* (2006.01)
  *H04B 7/212* (2006.01)
  *H04J 3/00* (2006.01)

(52) U.S. Cl.
  USPC ..... 455/434; 455/422.1; 455/437; 455/552.1; 370/328; 370/335; 370/337; 375/344

(58) Field of Classification Search
  USPC .......... 455/67.11, 127.4, 160.1, 161.2, 161.3, 455/182.1, 303, 434, 432.1, 435.1, 435.2, 455/435.3, 437, 447, 450, 452.1, 502, 512, 455/513, 515, 69, 226.1, 422.1, 552.1; 370/328, 370/329, 331–332, 335, 336, 338, 341, 342, 370/343, 348, 337; 375/145, 344, 147, 346, 375/350

See application file for complete search history.

(56) References Cited

U.S. PATENT DOCUMENTS 6,205,334 B1 * 3/2001 Dent .............................. 455/434
6,490,442 B1 * 12/2002 Billon ........................ 455/226.1

(Continued)

FOREIGN PATENT DOCUMENTS

CN  1333983 A  1/2002
CN  1468021 A  1/2004

(Continued)

OTHER PUBLICATIONS

International Search Report issued Dec. 11, 2008 in connection with International Patent Application No. PCT/CN2008/072396.

(Continued)

*Primary Examiner* — Andrew Wendell
*Assistant Examiner* — Paul P Tran

(57) ABSTRACT

The present invention discloses a method and an apparatus for searching for modes and frequencies. The method includes: obtaining signal energy of all frequency grids within a frequency range; obtaining energy of each mode on a smallest bandwidth according to the signal energy of the grids; sorting the energy on the smallest bandwidths of all modes; and accessing a specified number of frequencies and modes of the highest energy in the sorting result. With the present invention, energy on the smallest bandwidths of all modes at a frequency band is obtained and sorted and then an access mode is determined according to the sorting result. Thus the access mode to use for a specified frequency can be quickly determined so as to improve the access success rate of a terminal in the subsequent access process.

13 Claims, 7 Drawing Sheets

U.S. PATENT DOCUMENTS

| | | | |
|---|---|---|---|
| 6,553,229 B1 | 4/2003 | Dent | |
| 7,599,335 B2 * | 10/2009 | Zalio et al. | 370/335 |
| 2003/0236079 A1 | 12/2003 | Hasegawa | |
| 2008/0181097 A1 * | 7/2008 | Goldberg et al. | 370/210 |
| 2009/0154614 A1 * | 6/2009 | Storm et al. | 375/344 |
| 2010/0158079 A1 * | 6/2010 | Li et al. | 375/147 |

FOREIGN PATENT DOCUMENTS

| | | | |
|---|---|---|---|
| CN | 1640157 A | | 7/2005 |
| EP | 1 367 844 A1 | | 12/2003 |
| GB | 2 409 610 A | | 6/2005 |
| JP | 2007129322 A | | 5/2007 |
| WO | WO 2004/010719 A1 | | 1/2004 |
| WO | WO 2004010719 A1 | * | 1/2004 |

OTHER PUBLICATIONS

Communication pursuant to Article 94(3) EPC issued on Mar. 28, 2012 in connection with European Patent Application No. 08 800 890.9.

Written Opinion of the International Searching Authority dated Dec. 11, 2008 in connection with International Patent Application No. PCT/CN2008/072396.

Supplementary European Search Report dated Apr. 12, 2011 in connection with European Patent Application No. EP 08 80 0890.

* cited by examiner

METHOD AND APPARATUS FOR SEARCHING FOR MODES AND FREQUENCIES

CROSS-REFERENCE TO RELATED APPLICATIONS

This application is a continuation of International Application No. PCT/CN2008/072396, filed on Sep. 17, 2008, which claims priority to Chinese Patent Application No. 200810097935.0, filed on May 19, 2008 and No. 200710198656.9, filed on Dec. 27, 2007, all of which are hereby incorporated by reference in their entireties.

TECHNICAL FIELD

The present invention relates to communications technologies, and in particular, to a method and an apparatus for searching for modes and frequencies.

BACKGROUND

With the development of wireless communications technologies, more and more spectrum resources are allocated for wireless or cellular communications. In different countries, the frequencies used in a regional or wireless network may be part of the spectrum resources. When User Equipment (UE) is powered on, the UE may not know the current accessible frequencies. In addition, there may be multiple frequencies of multiple access modes in a same frequency band. Therefore, when the UE is powered on, it does not know which frequency in the band and which access mode it should use to access a network.

A common method in the prior art is: searching for each possible mode such as the Global System for Mobile Communications (GSM), Long Term Evolution (LTE), and Wideband Code Division Multiple Access (WCDMA) in each available frequency range.

During the implementation of the present invention, the inventor discovers at least the following weakness in the prior art:

A frequency must be measured repeatedly. Therefore, the measurement cycle is long. Take a 60 MHz band as an example. All GSM, LTE, and WCDMA systems may operate at the band. For GSM, 60/0.2-300 frequencies need to be measured. For LTE, 60/1.25=48 frequencies need to be measured. For WCDMA, 60/5=12 frequencies need to be measured. The measurement results of each mode need to be averaged, and thus the measurement workload is heavy. In addition, due to the existence of multiple modes, it may be necessary to synchronize the frequencies of the highest power of each mode and therefore the time required is long. For a WCDMA frequency, a UE may first check whether it can be synchronized with a GSM frequency, then check whether it can be synchronized with an LTE frequency, and then check whether it can be synchronized with a WCDMA frequency. As a result, the search process takes a long time.

SUMMARY

Embodiments of the present invention provide a method and an apparatus for searching for modes and frequencies to shorten the search for access frequencies and modes.

For the above purpose, a method for searching for modes and frequencies includes:
 obtaining signal energy of all frequency grids within a frequency range;
 obtaining energy on a smallest bandwidth of each mode according to the signal energy of the grids;
 sorting the energy on the smallest bandwidths of all modes; and
 accessing a specified number of frequencies and modes of highest energy in the sorting result.

An apparatus for searching for modes and frequencies includes:
 a grid energy obtaining unit, adapted to obtain signal energy of all frequency grids within a frequency range;
 a mode energy obtaining unit, adapted to obtain on a smallest bandwidth of each mode according to the signal energy of all the frequency grids obtained by the grid energy obtaining unit;
 a sorting unit, adapted to sort the energy on the smallest bandwidths of all modes obtained by the mode energy obtaining unit; and
 an accessing unit, adapted to access a specified number of frequencies and modes of highest energy in the sorting result of the sorting unit.

Compared with the prior art, the present invention offers the following benefits:

In the embodiments of the present invention, energy of all modes on the smallest bandwidth at a frequency band is obtained and sorted and access is performed according to the sorting result so as to shorten the search for access frequencies and modes and increase the access success rate of UEs.

DETAILED DESCRIPTION

Figure 1:
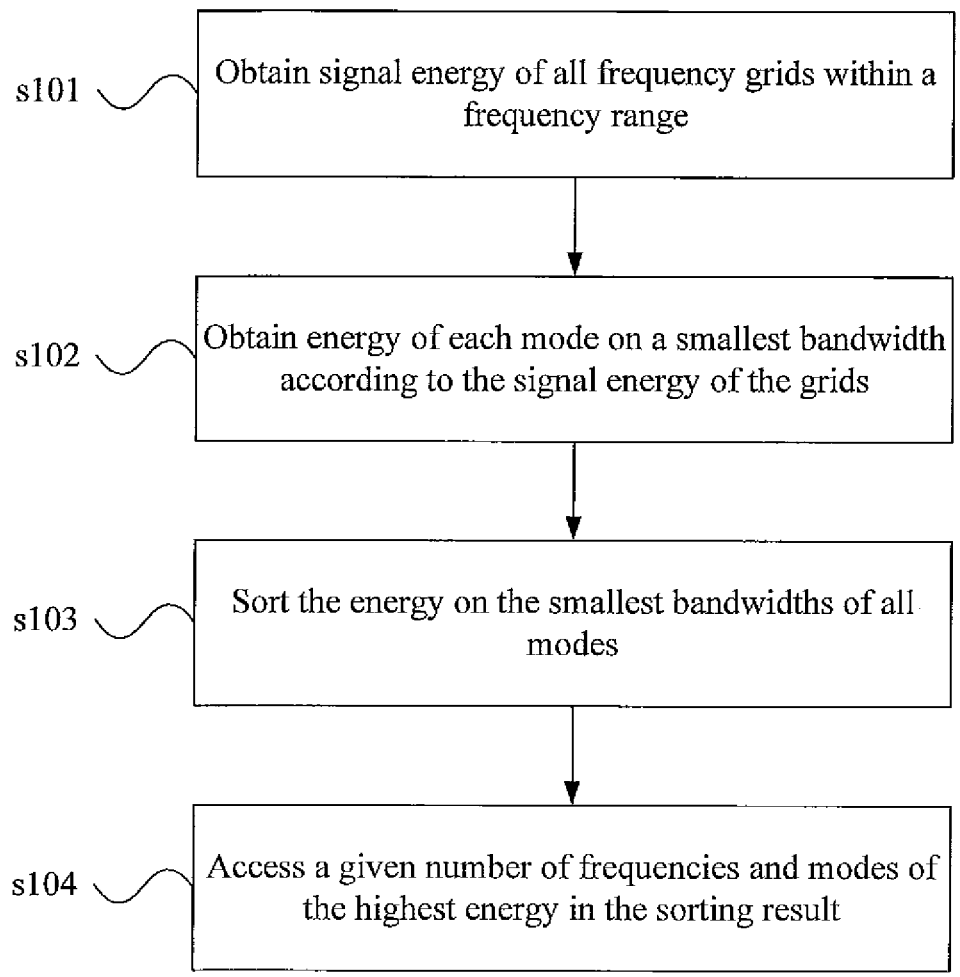
FIG. 1 is a flowchart of a method for searching for modes and frequencies in an embodiment of the present invention.

An embodiment of the present invention provides a method for searching for modes and frequencies so that a UE can search for the access modes that should be used at specified frequencies in a frequency band when multiple modes exist in the band. As shown in FIG. 1, the method includes the following blocks:

Block s101: Obtain signal energy of all frequency grids within a frequency range.

Block s102: Obtain the energy of each mode on the smallest bandwidth according to the signal energy of all grids.

Block s103: Sort the energy of all modes on the smallest bandwidths.

Block s104: Access a specified number of frequencies and modes of the highest energy in the sorting result.

By using the method provided in the embodiment of the present invention, the energy on the smallest bandwidths of all modes at a frequency band is obtained and sorted and the access mode is determined according to the sorting result. Thus, by using the method, the access mode for a specified frequency can be quickly determined and therefore the access success rate of a UE in the subsequent access process is improved.

Figure 2:
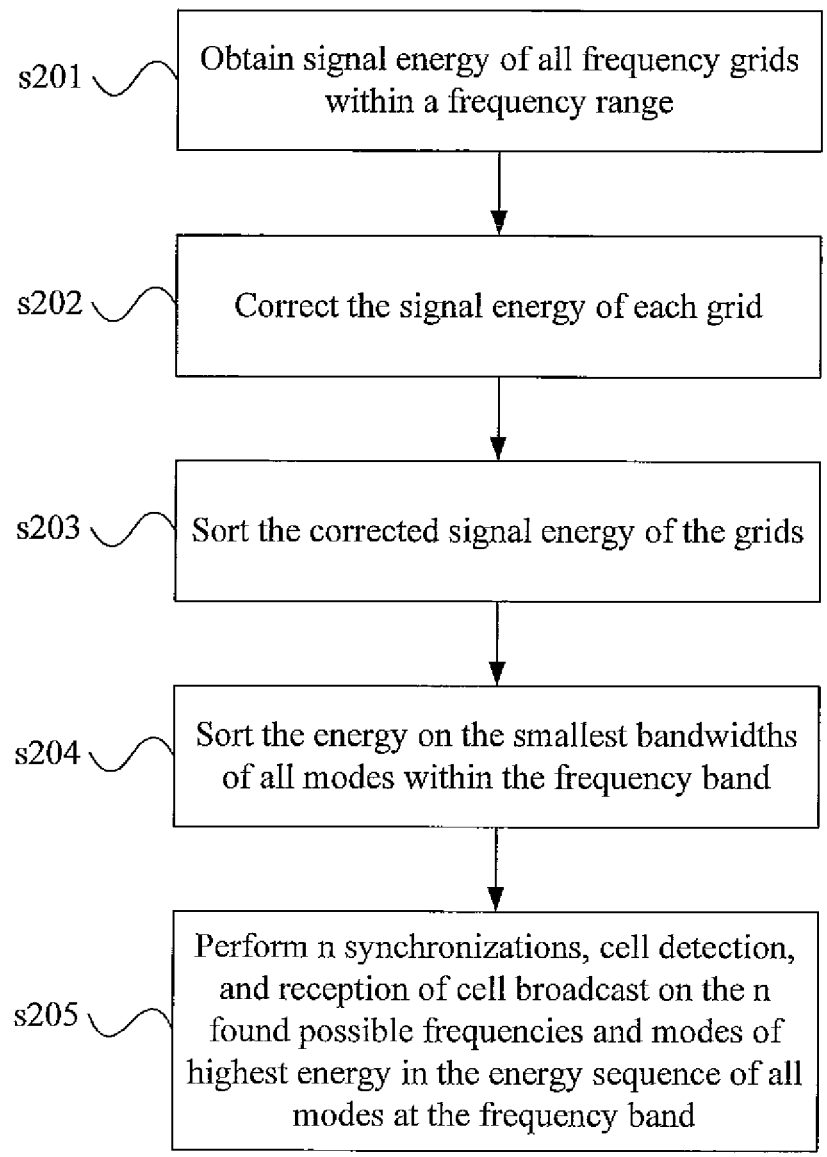
FIG. 2 is another flowchart of a method for searching for modes and frequencies in an embodiment of the present invention.

The embodiment of the present invention is further detailed with reference to a specific scenario. The access modes include GSM, WCDMA, and LTE. The mode and frequency searching method in the embodiment is shown in FIG. 2 and includes the following blocks:

Block s201: Obtain signal energy of all frequency grids within a frequency range.

Particularly, the signal energy of a frequency grid within a continuous frequency range is measured and the signal energy obtained in multiple measurements are added to get an average which is recorded as the signal energy of the grid.

Block s202: Correct the signal energy of each grid.

In particular, according to the adjacent band frequency response of a filter, a grid of the highest signal energy is found within the entire continuous frequency range. The grid is first marked as correction not required. Then the first adjacent frequency attenuation of the highest energy is deducted from the energy of the first adjacent frequency and the second adjacent frequency attenuation of the highest energy is deducted from the energy of the second adjacent frequency. Generally, the attenuation of the third adjacent frequency does not need correction.

Then a grid of the highest energy is found again from the grids except the one marked as correction not required. The step is repeated until all grids are marked as correction not required.

Block s203: Obtain the energy of each mode on the smallest band according to the corrected signal energy of the grids and mark the grids according to the amount of energy.

Figure 3:
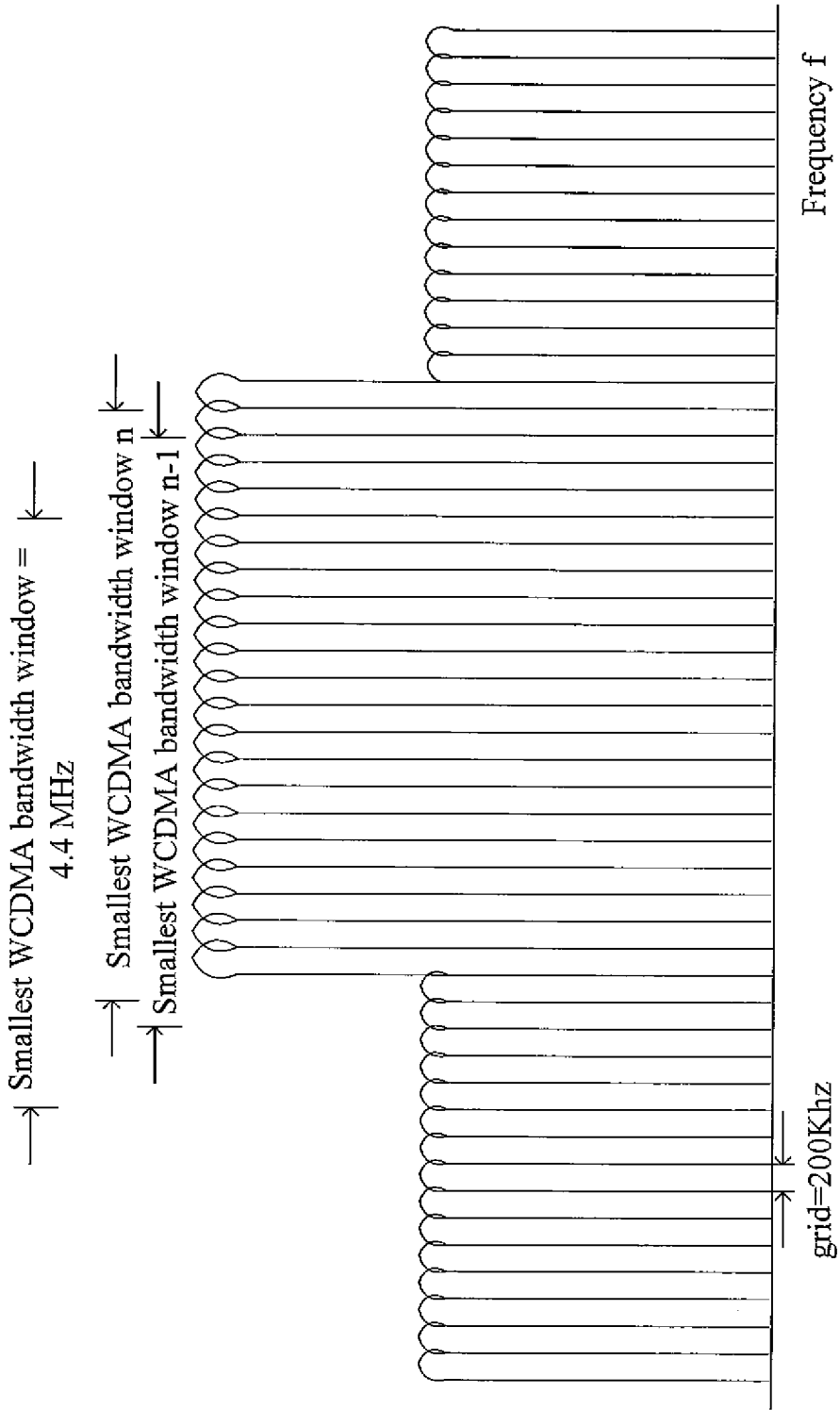
FIG. 3 illustrates calculation of energy on the smallest bandwidth of the WCDMA mode in an embodiment of the present invention.
Figure 4:
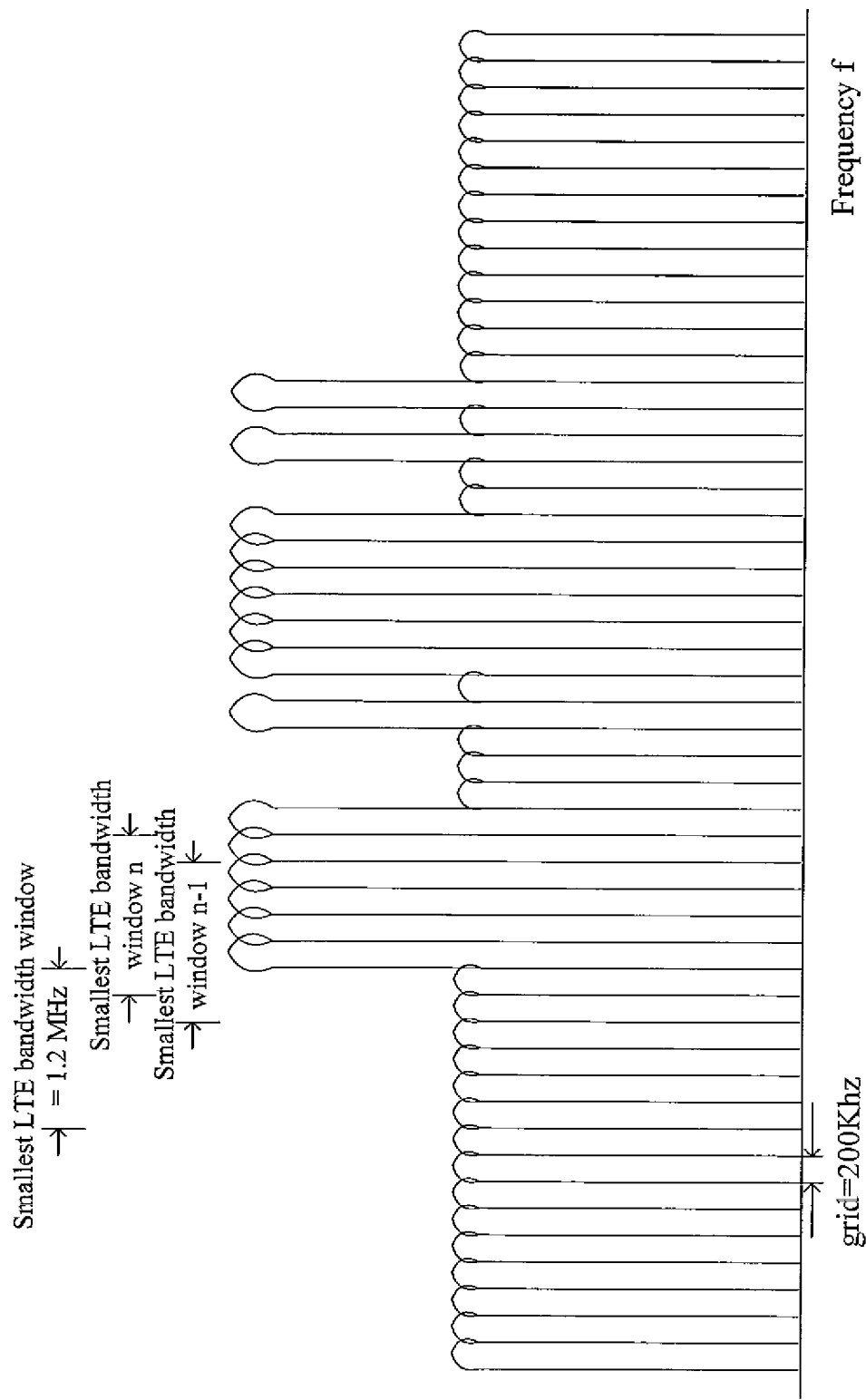
FIG. 4 illustrates calculation of energy on the smallest bandwidth of the LTE mode in an embodiment of the present invention.

The sorting method is as follows:

According to a selected mode, a window is opened on the smallest bandwidth; the signal energy of grids in the smallest bandwidth window is added; the bandwidth window is slid as per a grid and the energy of the window is calculated in each slide until the energy measurement of the mode on every smallest bandwidth at the entire band is obtained. During the calculation of widow energy, the measurement of energy of an adjacent window needs to deduct only the energy of the grid leaving the window and add the energy of the new grid entering the window. This method may reduce the calculation workload. For example, as shown in FIG. 2 and FIG. 3, in the WCDMA or LTE mode, the energy of window n equals the energy of window n-1 minus the energy of the first grid in window n-1 and plus the energy of the last grid in window n.

In the continuous frequency range, open a window on a found smallest bandwidth of the highest energy, mark the window as found and set its energy sorting value to 1 or mark the energy of the window and then set the energy measured on the smallest bandwidths containing respectively the left and right halves of the window to 0. Perform iteration to find the grid of the highest energy except those in the marked smallest bandwidth windows and the windows whose energy value is set to 0. The step is repeated to get a sorted energy sequence until all smallest bandwidth windows are marked with an energy sorting value or the energy of those windows is set to 0.

Block s204: Complete block s203 with respect to all possible modes within the frequency band and sort the energy on the smallest bandwidths of all modes within the band uniformly.

The result may be that GSM signal energy is high on frequency 1 and that WCDMA signal energy is high on frequency 200. In a specified frequency band, n strongest signals and modes can be found (n can be set as required). In the event of frequency overlap, mixed sorting of different modes may be carried out. Mixed sorting is performed on the measurement results of different modes with overlapped frequencies. For example, the smallest bandwidth of WCDMA is 4.4 MHz and a strong GSM frequency and a strong WCDMA frequency are found within the bandwidth. The following inequation must be considered in the overlap condition. This means the energy of the GSM frequency must satisfy:

$$E_{GSM} > T_1 * E_{WCDMA} / (f_{WCDMA}/f_{GSM}) \quad (1)$$

In the inequation, $T_1$ is a threshold which may be 10; $f_{WCDMA}$ and $f_{GSM}$ are the smallest bandwidths (the measured bandwidth) of WCDMA and GSM, respectively; $E_{GSM}$ and $E_{WCDMA}$ are the signal energy of GSM and WCDMA obtained on the measured bandwidth, respectively.

If the inequation is satisfied, the frequency is regarded as a GSM frequency and the possibility of a WCDMA frequency is eliminated. If the inequation is not satisfied, the frequency is regarded as a WCDMA frequency instead of a GSM frequency.

Similar processing is carried out on overlapped LTE and GSM signals to judge whether the following inequation is satisfied:

$$E_{GSM} > T_2 * E_{LTE} / (f_{LTE}/f_{GSM}) \quad (2)$$

Similar processing is carried out on overlapped LTE and WCDMA signals to judge whether the following inequation is satisfied:

$$E_{LTE} > T_3 * E_{WCDMA} / (f_{WCDMA}/f_{LTE}) \quad (3)$$

In inequations (1)-(3), $T_1$, $T_2$, and $T_3$ are different thresholds. In practice, the inequations and parameters are limited to the above inequations and parameters. In addition, in all overlap conditions, the method judges whether the measured signal of the smaller bandwidth is true.

Block s205: Perform n synchronizations, cell detection, and reception of cell broadcast on the n found possible frequencies and modes of highest energy in the energy sequence of all modes at the frequency band.

If a UE receives cell broadcast and camps on the cell successfully, the UE receives other mode and frequency information via cell broadcast and exits the search. Otherwise, the UE proceeds to search in a next possible frequency band. The search continues until an available mode or frequency band is found or else all modes and frequencies are searched.

By using the method provided in the embodiment of the present invention, the energy of all modes on the smallest bandwidth at a frequency band is obtained and sorted and the UE is accessed according to the sorting result. Thus, by using the method, the access success rate of the UE is increased and the time required for successful access is reduced.

Figure 5:
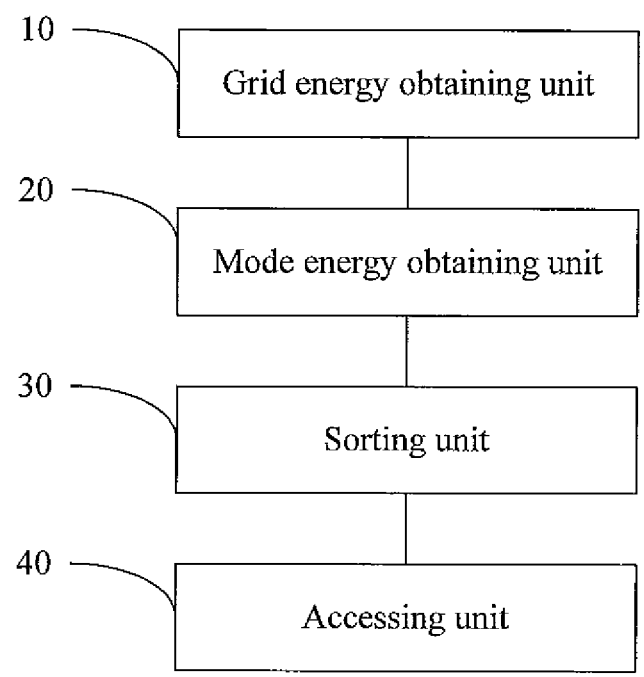
FIG. 5 shows a structure of an apparatus for searching for modes and frequencies in an embodiment of the present invention.

An embodiment of the present invention provides an apparatus for searching for modes and frequencies. As shown in FIG. 5, the apparatus includes:

a grid energy obtaining unit 10, adapted to obtain the signal energy of each frequency grid within a frequency range;

a mode energy obtaining unit 20, adapted to obtain the energy on a smallest bandwidth of each mode according to the signal energy of all the frequency grids obtained by the grid energy obtaining unit 10;

a sorting unit 30, adapted to sort the energy on the smallest bandwidths of all modes obtained by the mode energy obtaining unit 20; and an accessing unit 40, adapted to access a specified number of frequencies and modes of highest energy in the sorting result of the sorting unit 30.

Figure 6:
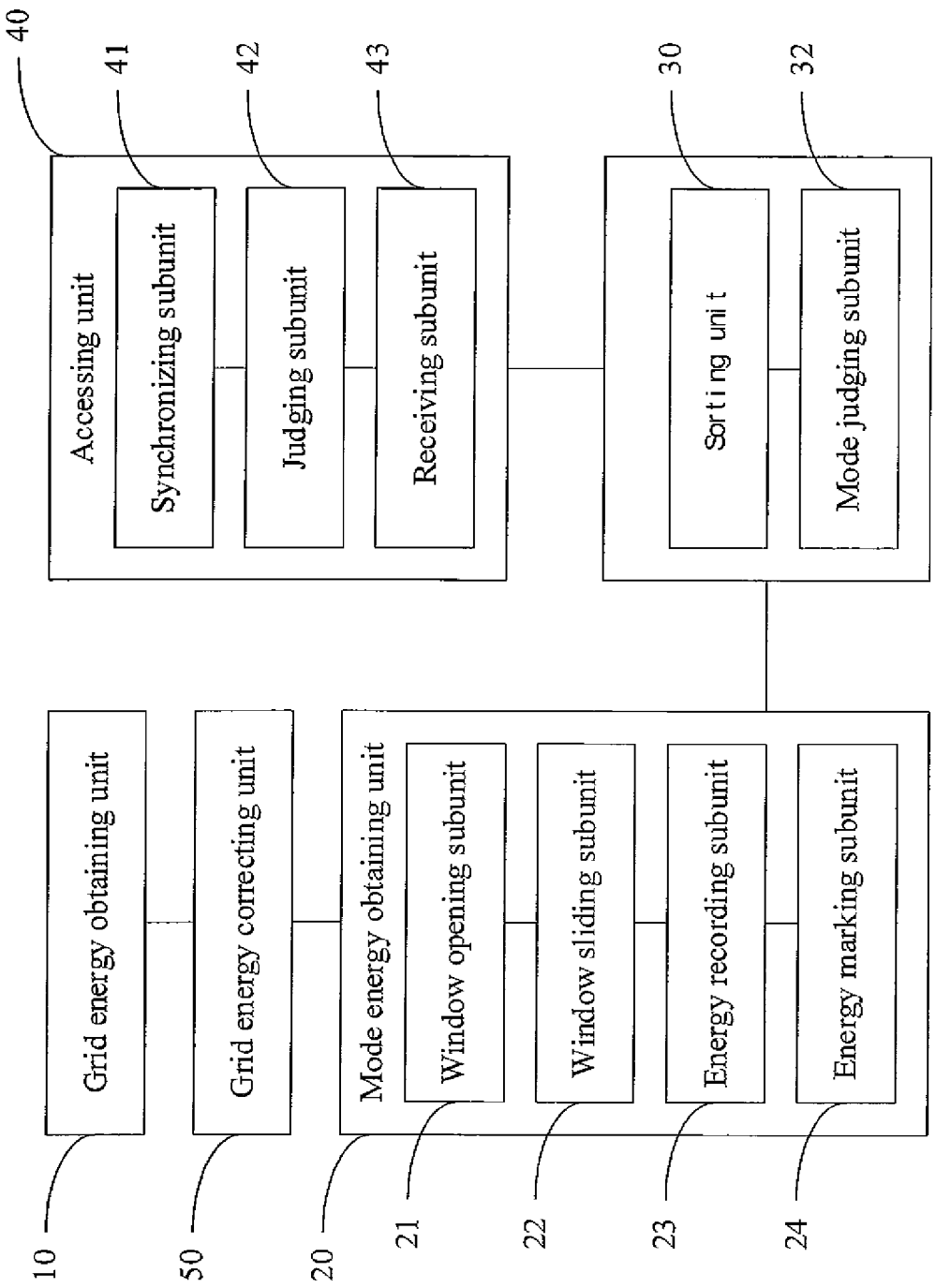
FIG. 6 shows another structure of the apparatus for searching for modes and frequencies in an embodiment of the present invention.

As shown in FIG. 6, the apparatus may further include:

a grid energy correcting unit 50, adapted to correct the signal energy of all the frequency grids obtained by the grid energy obtaining unit 10 and send the corrected signal energy of the grids to the mode energy obtaining unit 20.

The mode energy obtaining unit 20 may include:

a window opening subunit 21, adapted to open a window according to the smallest bandwidth of a selected mode;

a window sliding subunit 22, adapted to slide the smallest bandwidth window opened by the window opening subunit 21 as per a grid;

an energy recording subunit 23, adapted to obtain a sum of signal energy of grids in the smallest bandwidth window in each slide of the window sliding subunit 22, that is, to obtain the energy of the mode on every smallest bandwidth at the frequency band; and an energy marking subunit 24, adapted to mark the energy of the mode on every smallest bandwidth recorded by the energy recording subunit 23 according to the amount of energy.

The apparatus may further include:

a mode judging subunit 32, adapted to judge the mode of the strong frequency when a strong frequency of another mode is found on the smallest bandwidth of a mode. In particular, the mode judging subunit 32 may be a first judging unit, adapted to judge whether $E_1 > T^*E_2/(f_2/f_1)$ is satisfied, and if the inequation is satisfied, determine that the strong frequency belongs to the first mode, if the inequation is not satisfied, determine that the strong frequency belongs to the second mode. In the inequation, $f_1$ is the smallest bandwidth of the possible first mode; $E_1$ is the signal energy of the possible first mode; $f_2$ is the smallest bandwidth of the possible second mode; $E_2$ is the signal energy of the possible second mode; and T is a predetermined threshold.

The accessing unit 40 may include:

a synchronizing subunit 41, adapted to perform synchronization, cell detection and reception of cell broadcast on each of a specified number of frequencies and modes of highest energy;

a judging subunit 42, adapted to determine that the synchronization is successful and that the search is complete after broadcast is received from a cell synchronized by the synchronizing subunit 41 and camping on the cell is successful, or else notify the synchronizing subunit 41 to search in a next possible frequency band; and a receiving subunit 43, adapted to receive mode and frequency information via cell broadcast after the judging subunit 42 determines that the synchronization is successful.

Figure 7:
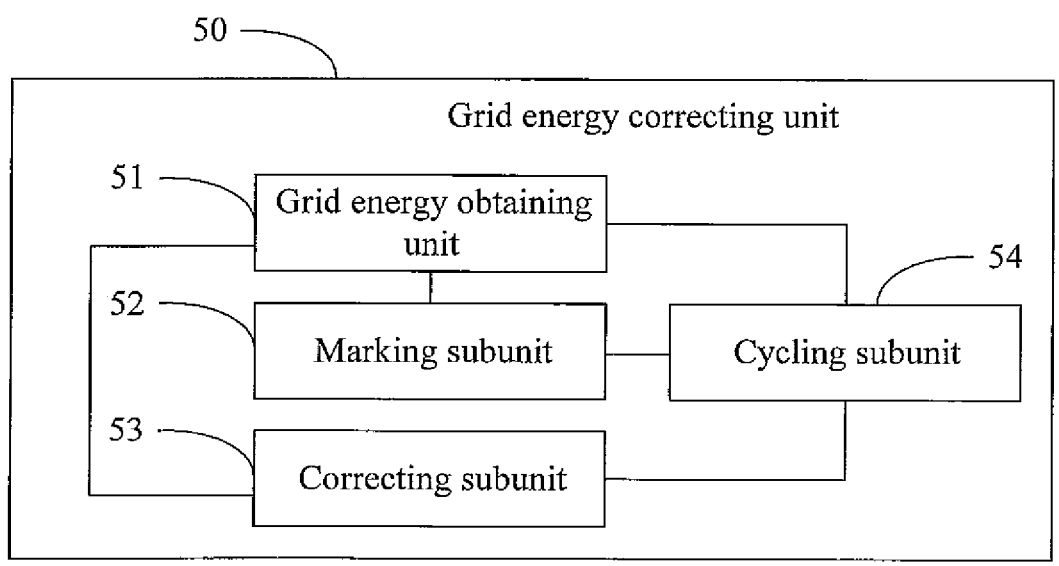
FIG. 7 shows a structure of a grid energy correcting unit in the apparatus for searching for modes and frequencies in an embodiment of the present invention.

As shown in FIG. 7, the grid energy correcting unit 50 may include:

a grid obtaining subunit 51, adapted to obtain a grid of the highest signal energy in the frequency range;

a marking subunit 52, adapted to mark the grid obtained by the grid obtaining unit 51 as correction not required;

a correcting subunit 53, adapted to deduct a first adjacent frequency attenuation of the highest energy from the energy of the first adjacent frequency of the grid of the highest energy obtained by the grid obtaining subunit 51 and deduct a second adjacent frequency attenuation of the highest energy from the energy of the second adjacent frequency of the grid of the highest energy obtained by the grid obtaining subunit 51; and a cycling subunit 54, adapted to control the grid obtaining subunit to obtain the grid of the highest energy in grids except the grid marked as correction not required after the correcting subunit 53 completes correcting the grid of the highest energy and the correcting subunit to repeat the energy correction process until all grids are marked as correction not required.

By using the method provided in the embodiment of the present invention, the energy of all modes on the smallest bandwidth at a frequency band is obtained and sorted and the UE is accessed according to the sorting result. Thus, by using the method, the access success rate of the UE is increased and the time required for successful access is reduced.

Based on the descriptions of the foregoing embodiments, those skilled in the art will be clear that the embodiments of the present invention can be implemented by hardware or implemented by software on a necessary general hardware platform. Based on such understanding, the technical solution of the present invention may be represented by a software product, which may be stored in a nonvolatile storage medium, such as a Compact Disc-Read Only Memory (CD-ROM), a USB disk, and a mobile hard disk. The software product includes a number of instructions that enable a computer device (which may be a personal computer, a server or a network device) to execute the method according to the embodiments of the present invention.

Although the technical solution of the present invention has been described through exemplary embodiments, the invention is not limited to such embodiments. It is apparent that those skilled in the art can make various modifications and variations to the invention without departing from the spirit and scope of the invention. The invention is intended to cover the modifications and variations provided that they fall within the scope of protection defined by the claims or their equivalents.

What is claimed is:

1. A method for searching for modes and frequencies by a User Equipment (UE), the method comprising:

obtaining, by the UE, signal energy of all frequency grids within a frequency range;

obtaining for each mode, using the obtained signal energy of all frequency grids, the signal energy in each of a plurality of smallest bandwidths within the mode over the frequency range;

sorting the energy on the smallest bandwidths of all modes;

accessing a specified number of frequencies and modes of highest energy in the sorting result; and wherein obtaining the signal energy in each of a plurality of smallest bandwidths within the mode over the frequency range comprises:

opening a window according to the smallest bandwidth of a selected mode, wherein the number of the frequency grids included in the window is equal to the number of the frequency grids of the smallest bandwidth of the selected mode, sliding over the frequency range the smallest bandwidth window by one frequency grid in each slide and obtaining a sum of signal energy of frequency grids in the smallest bandwidth window in each slide as the energy on each smallest bandwidth of the mode, and marking the energy on each smallest bandwidth of the mode according to the amount of energy.

2. The method of claim 1, wherein after obtaining the signal energy of all frequency grids within the frequency range, the method further comprises:
correcting the obtained signal energy of all grids.

3. The method of claim 2, wherein correcting the obtained signal energy of all grids comprises:
obtaining a grid of highest energy within the frequency range and marking the grid as correction not required;
deducting a first adjacent frequency attenuation of the highest energy from the energy of the first adjacent frequency of the grid of the highest energy and deducting a second adjacent frequency attenuation of the highest energy from the energy of the second adjacent frequency of the grid of the highest energy; and
obtaining a grid of highest energy except the grid marked as correction not required and repeating the correction process until all grids are marked as correction not required.

4. The method of claim 3, wherein accessing the specified number of frequencies and modes of the highest energy in the sorting result comprises:
performing synchronization, cell detection, and reception of cell broadcast on each of the specified number of frequencies and modes of the highest energy;
receiving mode and frequency information via cell broadcast and ending the search if cell broadcast is received and camping on a cell is successful; if cell broadcast is not received and camping on a cell is unsuccessful, proceeding to search in a next possible frequency band until an available mode and frequency are found.

5. The method of claim 1, further comprising:
judging the mode of the strong frequency when a strong frequency of another mode exists on a smallest bandwidth of one mode.

6. The method of claim 5, wherein judging the mode of the strong frequency comprises:
a possible first mode, whose smallest bandwidth is $f_1$ and whose signal energy is $E_1$;
a possible second mode, whose smallest bandwidth is $f_2$ and whose signal energy is $E_2$;
judging whether $E_1 > T*E_2/(f_2/f_1)$ is satisfied, where T is a predetermined threshold; and
determining that the strong frequency belongs to the first mode if the inequation is satisfied; determining that the strong frequency belongs to the second mode if the inequation is not satisfied.

7. The method of claim 1, wherein accessing the specified number of frequencies and modes of the highest energy in the sorting result comprises:
performing synchronization, cell detection, and reception of cell broadcast on each of the specified number of frequencies and modes of the highest energy;
receiving mode and frequency information via cell broadcast and ending the search if cell broadcast is received and camping on a cell is successful; if cell broadcast is not received and camping on a cell is unsuccessful, proceeding to search in a next possible frequency band until an available mode and frequency are found.

8. An apparatus for searching for modes and frequencies, the apparatus comprising:
a grid energy obtaining unit, adapted to obtain signal energy of all frequency grids within a frequency range;
a mode energy obtaining unit, adapted to obtain for each mode, using the obtained signal energy of all frequency grids, the signal energy in each of a plurality of smallest bandwidths within the mode over the frequency range;
a sorting unit, adapted to sort the energy on the smallest bandwidths of all modes obtained by the mode energy obtaining unit;
an accessing unit, adapted to access a specified number of frequencies and modes of highest energy in the sorting result of the sorting unit; and
wherein the mode energy obtaining unit comprises:
a window opening open a window according to the smallest bandwidth of a selected mode, wherein the number of the frequency grids included in the window is equal to the number of the frequency grids of the smallest bandwidth of the selected mode,
a window sliding subunit, adapted to slide over the frequency range the smallest bandwidth window opened by the window opening subunit by one frequency grid in each slide,
an energy recording subunit, adapted to obtain a sum of signal energy of frequency grids in the smallest bandwidth window in each slide of the window sliding subunit, that is, to obtain energy on every smallest bandwidth of the mode at the frequency band, and
an energy marking subunit, adapted to mark the energy on every smallest bandwidth of the mode recorded by the energy recording subunit according to the amount of energy.

9. The apparatus of claim 8, further comprising:
a grid energy correcting unit, adapted to correct the signal energy of all grids obtained by the grid energy obtaining unit and send the corrected signal energy of the grids to the mode energy obtaining unit.

10. The apparatus of claim 9, wherein the grid energy obtaining unit comprises:
a grid obtaining subunit, adapted to obtain a grid of highest signal energy in the frequency range;
a marking subunit, adapted to mark the grid obtained by the grid obtaining unit as correction not required;
a correcting subunit, adapted to deduct a first adjacent frequency attenuation of the highest energy from the energy of the first adjacent frequency of the grid of the highest energy and deduct a second adjacent frequency attenuation of the highest energy from the energy of the second adjacent frequency of the grid of the highest energy; and
a cycling subunit, adapted to control the grid obtaining subunit to obtain a grid of the highest energy except the grid marked as correction not required after the correcting subunit completes correcting the grid of the highest energy, and the correcting subunit to repeat the energy correction process until all grids are marked as correction not required.

11. The apparatus of claim 8, further comprising:
a mode judging subunit, adapted to judge the mode of the strong frequency when a strong frequency of another mode is found on a smallest bandwidth of one mode.

12. The apparatus of claim 11, wherein: the mode judging subunit may be a first judging unit, adapted to judge whether $E_1 > T*E_2/(f_2/f_1)$ is satisfied and if the inequation is satisfied, determine that the strong frequency belongs to a first mode, and if the inequation is not satisfied, determine that the strong frequency belongs to a second mode, where $f_1$ is the smallest bandwidth of the possible first mode, $E_1$ is the signal energy of the possible first mode, $f_2$ is the smallest bandwidth of the possible second mode, $E_2$ is the signal energy of the possible second mode, and T is a predetermined threshold.

13. The apparatus of claim 8, wherein the accessing unit comprises:

a synchronizing subunit, adapted to perform synchronization, cell detection, and reception of cell broadcast on each of the specified number of frequencies and modes of highest energy;

a judging subunit, adapted to determine that the synchronization is successful and that the search is complete after broadcast is received from a cell synchronized by the synchronizing subunit and camping on the cell is successful, and notify the synchronizing subunit to search in a next possible frequency band if broadcast is not received from a cell synchronized by the synchronizing subunit or camping on the cell is unsuccessful; and a receiving subunit, adapted to receive mode and frequency information via cell broadcast after the judging subunit determines that the synchronization is successful.

\* \* \* \* \*

UNITED STATES PATENT AND TRADEMARK OFFICE
CERTIFICATE OF CORRECTION

| | |
|---|---|
| PATENT NO. | : 8,467,787 B2 |
| APPLICATION NO. | : 12/779712 |
| DATED | : June 18, 2013 |
| INVENTOR(S) | : Gengshi Wu |

Page 1 of 1

It is certified that error appears in the above-identified patent and that said Letters Patent is hereby corrected as shown below:

In the Claims

Column 8, Claim 8, line 10, after "opening" insert -- subunit, adapted to --

Signed and Sealed this
Seventh Day of October, 2014

Michelle K. Lee
*Deputy Director of the United States Patent and Trademark Office*